United States Patent
Cho et al.

(10) Patent No.: US 10,586,887 B2
(45) Date of Patent: Mar. 10, 2020

(54) DETERMINISTIC QUANTUM EMITTER OPERATING AT ROOM TEMPERATURE IN OPTICAL COMMUNICATION WAVELENGTH USING INTERSUBBAND TRANSITION OF NITRIDE-BASED SEMICONDUCTOR QUANTUM DOT, METHOD OF FABRICATING SAME, AND OPERATING METHOD THEREOF

(71) Applicant: Korea Advanced Institute of Science and Technology, Daejeon (KR)

(72) Inventors: Yong-Hoon Cho, Daejeon (KR);
Hwanseop Yeo, Daejeon (KR);
JongHoi Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/036,556

(22) Filed: Jul. 16, 2018

(65) Prior Publication Data
US 2019/0027645 A1 Jan. 24, 2019

(30) Foreign Application Priority Data
Jul. 19, 2017 (KR) .......................... 10-2017-0091368

(51) Int. Cl.
*H01L 33/06* (2010.01)
*H01L 33/00* (2010.01)
(Continued)

(52) U.S. Cl.
CPC .............. *H01L 33/06* (2013.01); *G06F 21/31* (2013.01); *H01L 33/007* (2013.01);
(Continued)

(58) Field of Classification Search
CPC ....... H01L 33/06; H01L 33/007; H01L 33/24; H01L 33/08; H01L 33/387;
(Continued)

(56) References Cited

U.S. PATENT DOCUMENTS

| 10,026,912 B1* | 7/2018 | Cao ..................... H01L 51/0048 |
| 2003/0127608 A1* | 7/2003 | Shields .................. B82Y 10/00 |
| | | 250/493.1 |
| 2006/0220000 A1* | 10/2006 | Bennett .................. B82Y 10/00 |
| | | 257/14 |

FOREIGN PATENT DOCUMENTS

| JP | 2003-218395 | 7/2003 |
| KR | 10-2008-0104368 | 12/2008 |

(Continued)

*Primary Examiner* — Anthony Ho
(74) *Attorney, Agent, or Firm* — Miller, Matthias & Hull LLP

(57) ABSTRACT

Disclosed are a deterministic quantum emitter operating at room temperature in an optical communication wavelength using the intersubband transition of a nitride-based semiconductor quantum dot, a method of fabricating the same, and an operating method thereof. A method of fabricating a quantum emitter includes forming a three-dimensional (3-D) structure in a substrate, forming an n type-doped thin film at the upper part of the 3-D structure, forming a quantum dot over the n type-doped thin film, regrowing the 3-D structure in order to use the 3-D structure as an optical structure, depositing a metal thin film at a vertex of the 3-D structure, and connecting electrodes to an n type-doped area and the metal thin film, respectively. A carrier may be captured in the quantum dot by applying a voltage to the connected electrodes. The quantum emitter may be driven by optically exciting the quantum dot.

10 Claims, 12 Drawing Sheets

(51) Int. Cl.
  *H01L 33/08*   (2010.01)
  *H01L 33/24*   (2010.01)
  *H01L 33/38*   (2010.01)
  *G06F 21/31*   (2013.01)
  *H01L 33/32*   (2010.01)
  *G06N 10/00*   (2019.01)
  *H01L 27/15*   (2006.01)

(52) U.S. Cl.
  CPC .......... *H01L 33/0075* (2013.01); *H01L 33/08* (2013.01); *H01L 33/24* (2013.01); *H01L 33/387* (2013.01); *G06N 10/00* (2019.01); *H01L 27/153* (2013.01); *H01L 33/32* (2013.01); *H01L 2933/0016* (2013.01)

(58) Field of Classification Search
  CPC ... H01L 33/0075; H01L 27/153; H01L 33/32; H01L 2933/0016; G06F 21/31; G06N 10/00
  See application file for complete search history.

(56) References Cited

FOREIGN PATENT DOCUMENTS

| | | |
|---|---|---|
| KR | 10-1012265 | 2/2011 |
| KR | 10-1481722 | 1/2015 |

\* cited by examiner (a)

(b)

(a)

(b)

(c)

(d)

(a)　　　(b)　　　(c)　　　(d)

(a)      (b)      (c)      (d)

DETERMINISTIC QUANTUM EMITTER OPERATING AT ROOM TEMPERATURE IN OPTICAL COMMUNICATION WAVELENGTH USING INTERSUBBAND TRANSITION OF NITRIDE-BASED SEMICONDUCTOR QUANTUM DOT, METHOD OF FABRICATING SAME, AND OPERATING METHOD THEREOF

CROSS REFERENCE TO RELATED APPLICATION

The present application claims the benefit of Korean Patent Application No. 10-2017-0091368 filed in the Korean Intellectual Property Office on Jul. 19, 2017 the entire contents of which are incorporated herein by reference.

BACKGROUND OF THE INVENTION

1. Technical Field

The present invention relates to a deterministic quantum emitter operating at room temperature in an optical communication wavelength using the intersubband transition of a nitride-based semiconductor quantum dot, a method of fabricating the same, and an operating method thereof and, more particularly, to a deterministic quantum emitter operating at room temperature (300 K) or more while having a communication wavelength band of about 1.55 μm using the intersubband transition of a nitride-based semiconductor quantum dot, a technology for fabricating the deterministic quantum emitter, and an operating technology thereof.

2. Description of the Related Art

As the information communication technology is advanced, the importance of security is increased. The need for the development of quantum information communication that cannot be hacked owing to the non-cloning theorem of quantum and separation indivisibility, that is, characteristics of a quantum emitter, is increasing.

Information processing and calculation using the existing current signal has implemented a high degree of integration and calculation speed owing to the development of the process technology, but shows its limits due to a heating problem in an electronic device and a quantum-mechanical effect in a nanometer level as the amount of information processing is increased. Accordingly, the development of an information processing method using light in order to solve the heating problem in the information processing process is in progress. A demand for a quantum emitter capable of implementing a quantum physical phenomenon in optical communication are increasing as one method for overcoming the limits of the information communication field based on a traditional physical phenomenon.

A spontaneous parametric down conversion (SPDC) method is now used as one of multiple quantum emitters and is widely used in quantum optics research or quantum information experiments. This method may be used for quantum logic operation based on a quantum entanglement phenomenon in which lights generates two photons having a quantum entanglement relation while passing through nonlinear crystals. However, this method additionally requires a process of checking a heralded single photon in order for this method to be used in a clock-based system because photons are generated probabilistically based on the nonlinear process.

Accordingly, a related system is complicated, and an operation number is relatively reduced because photons are consumed to check the heralded single photon. Furthermore, this method has a principle limit that the operation number must be reduced for the accuracy of operation because there is a tradeoff between purity and brightness for a single photon state. Accordingly, a corresponding quantum emitter can operate at room temperature and has a wavelength of 1.55 μm, but has a limited operation speed due to the principle of probabilistic production of photons.

As an example of multiple quantum emitters, research related to quantum information communication in which the intensity of a laser having a pulse form in time is extremely reduced so that the original photon state of the laser has a physical state closer to a single photon state is in progress. However, such a quantum emitter has the same problem as the SPDC because a single photon is present with low probability per pulse. Accordingly, a semiconductor quantum dot using a thin film deposition method is being developed as a candidate capable of solving the problem in that photons are formed stochastically.

The semiconductor quantum dot means a semiconductor system having a three-dimensional (3-D) quantum confinement effect and may be used as a quantum emitter because an energy level has a discontinuous characteristic due to the 3-D quantum confinement effect.

A semiconductor quantum dot using the thin film deposition method may be used for a clock-based quantum system because a self-emissive process of photons is determined with respect to energy excitation in an ideal case. Furthermore, the semiconductor quantum dot has an advantage in that current driving is possible by forming an electrode because the semiconductor quantum dot is a semiconductor and can be doped in principle. Accordingly, a quantum emitter can become an element using the semiconductor quantum dot and may be commercialized. Furthermore, in general, the size of a semiconductor quantum dot is about 20 nm or less. If such semiconductor quantum dots are homogeneously fabricated using the thin film deposition method, quantum emitters can be mass-produced in a wafer scale.

In order to fabricate a semiconductor quantum dot emitting in a communication wavelength area, the strain relaxation mechanism of a crystalline structure using a III-As semiconductor compound is applied using molecular beam epitaxy (MBE), that is, one of thin film deposition methods. On March, 2016, there was reported that the execution capability of the SPDC method used as the existing quantum emitter was exceeded using the semiconductor quantum dot of the above type. Furthermore, a quantum key distribution, that is, a kind of quantum password, has been implemented up to 120 km using the semiconductor quantum dot of the above type. However, the mass production of the quantum emitter is limited because the semiconductor quantum dot requires an ultra low temperature of 4 K, that is, a liquid helium cooling temperature, in order for the semiconductor quantum dot to operate as the quantum emitter. Furthermore, in terms of III-As material properties using inter-band transition, that is, transition between emittable energy levels, a quantum confinement effect of holes cannot be implemented as a temperature is closer to room temperature because atoms do not have a high band offset. Accordingly, there is no room to improve a problem of an operation at room temperature.

In the present optical communication wavelength band, an example in which an operation issue at room temperature has been solved has not yet been reported regarding a quantum emitter having the smallest optical loss of 1.55 μm. In order for quantum optical communication to be advanced in the future, it is expected that the existing well-established optical communication networks will be applied using a plurality of optical channels (i.e., quantum emitters). Accordingly, the need for a technology capable of fabricating a quantum emitter capable of operating at room temperature in an optical communication wavelength band is increasing.

Korean Patent No. 10-1012265 relates to a method of fabricating a single carrier device operating at room temperature, and describes a technology relating to a single carrier device operating at room temperature using a plurality of silicide metal points formed in series as multiple quantum dots and a method of fabricating the same. The conventional patent is a technology relating to an electrical device using before-and after-capturing of a single carrier as an electrical signal of 0 and 1, and is different from a technology in which a nitride-based semiconductor quantum dot is used as an optical signal generator.

SUMMARY OF THE INVENTION

The present invention has been made to solve a problem in a quantum emitter of a semiconductor quantum dot using a thin film deposition method, and proposes the principle of a quantum emitter capable of operating at room temperature or more and also satisfying a communication wavelength area in such a manner that the intersubband transition of a nitride semiconductor quantum dot is used as an emission process.

The present invention proposes a method of fabricating the quantum emitter of a communication wavelength area capable of operating at room temperature or more.

The present invention provides a quantum emitter capable of operating at room temperature in a communication wavelength band, wherein a three-dimensional (3-D) structure of high-deterministic quality is configured to reduce a non-emission transition probability in the emission of a quantum dot and the intersubband energy levels of quantum dots are discontinuously defined at room temperature using a geometric shape of the 3-D structure, a method of fabricating the same, and an operating method thereof.

The present invention provides a structure in which a single carrier or two carriers can be injected through quantum tunneling at a ground level of intersubband of the nitride-based semiconductor quantum dot through voltage application. Accordingly, the present invention provides a quantum emitter capable of operating at room temperature in a communication wavelength band by removing a non-emission process which may occur in the intersubband transition of a nitride semiconductor quantum dot, a method of fabricating the same, and an operating method thereof.

The present invention provides a quantum emitter capable of operating at room temperature in a communication wavelength band which may be efficiently combined with optical fiber-based optical communication infrastructure by increasing light extraction efficiency using a 3-D structure as an optical structure and controlling emission directivity, a method of fabricating the same, and an operating method thereof.

Objects to be solved by the present invention are not limited to the aforementioned objects, and other objects not described above may be evidently understood by those skilled in the art from the following description.

A method of fabricating a quantum emitter according to an embodiment includes forming a three-dimensional (3-D) structure on a substrate, forming an n type-doped thin film at the upper part of the 3-D structure, forming a quantum dot over the n type-doped thin film, regrowing the 3-D structure in order to use the 3-D structure as an optical structure, depositing a metal thin film at a vertex of the 3-D structure, and connecting electrodes to an n type-doped area and the metal thin film, respectively, wherein a carrier may be captured in the quantum dot by applying a voltage to the connected electrodes.

In this case, the quantum emitter may be driven by optically exciting the quantum dot.

Forming the quantum dot over the n type-doped thin film may include forming the quantum dot in a heterostructure of III-nitride material which exhibits quantum confinement, for example, AlN/GaN/AlN or AlGaN/GaN/AlGaN in which gallium nitride (GaN) may be an active area using a nitride semiconductor. The quantum light emission of a communication wavelength band may be possible at room temperature or more using intersubband transition in a conduction band as an emission transition process of the quantum emitter.

Forming the 3-D structure in the substrate may include forming an n type-doped layer over the substrate, forming a mask over the n type-doped layer, and forming the 3-D structure using selective area growth by removing only a mark portion of a patterned area in the mask.

The 3-D structure may include at least one of a hexagonal pyramid, a triangular pyramid, a hexagonal pyramid having a top of a hexagonal column, and an inverted pyramid shape of a hexagonal pyramid.

The 3-D structure having the inverted pyramid shape of the hexagonal pyramid may include an inverted pyramid shape of a ring-shaped pattern or circular pattern by concave mode growth from selective area growth according to a combined form of triangles in a bottom-up method or an inverted pyramid shape of a circular pattern by wet etching in a top-down method.

The substrate may be made of at least one of silicon (Si), sapphire ($Al_2O_3$), silicon carbide (SiC), gallium lithium oxide ($LiGaO_3$), and III-nitride material, and the n type-doped layer deposited on the substrate may be made of at least one of gallium nitride (GaN), aluminum nitride (AlN), and aluminum gallium nitride ($Al_xGa_{1-x}N$) doped with an n type.

In forming the 3-D structure in the substrate, if the n type-doped area is the substrate or an n type-doped layer deposited on the substrate, a core forming the 3-D structure may be made of III-nitride material doped with an n type, such as, at least one substance of gallium nitride (GaN), aluminum nitride (AlN), and aluminum gallium nitride ($Al_xGa_{1-x}N$) doped with an n type.

If the core forming the 3-D structure is made of aluminum gallium nitride ($Al_xGa_{1-x}N$) doped with the n type, an n type doping level may be determined based on aluminum content within aluminum gallium nitride ($Al_xGa_{1-x}N$). After the n type doping, an excess carrier may be generated by activating a dopant. The n type doping level of the III-nitride material may be determined based on an applied voltage for performing quantum tunneling, and, after the n type doping, additional dopant activation process may be conducted to generate excess carriers.

Depositing the metal thin film at the vertex of the 3-D structure may include reducing a step by accumulating a polymer layer through spin coating in order to prevent the metal thin film from being broken by the 3-D structure.

A method of fabricating a quantum emitter according to another embodiment includes forming a three-dimensional (3-D) structure on a substrate using a selective area growth method, doping the 3-D structure with an n type or forming an n type-doped thin film at the upper part of the 3-D structure, forming a quantum dot at the upper part of the n type-doped 3-D structure or over the n type-doped thin film, and connecting electrodes to the n type-doped 3-D structure or an n type-doped area comprising the n type-doped thin film as a ground voltage and the top of the structure for the voltage difference, wherein a carrier may be captured in the quantum dot by applying a voltage to the connected electrode and the quantum emitter may be driven by optically exciting the quantum dot.

In this case, forming the quantum dot at the upper part of the n type-doped 3-D structure or over the n type-doped thin film may include forming the quantum dot in a heterostructure of III-nitride material which exhibits quantum confinement, for example, AlN/GaN/AlN or AlGaN/GaN/AlGaN in which gallium nitride (GaN) may be an active area using a nitride semiconductor. The quantum light emission of a communication wavelength band may be possible at room temperature or more using intersubband transition in a conduction band as an emission transition process of the quantum emitter.

An operating method of a quantum emitter according to yet another embodiment may include connecting electrodes to an n type-doped area on a substrate side and a metal thin film deposited on a structure side formed over the substrate, respectively, capturing a carrier in a quantum dot formed at the upper part of the structure by applying a voltage to the connected electrodes, and driving the quantum emitter by optically exciting the quantum dot.

In this case, the operating method may further include forming a three-dimensional (3-D) structure in the substrate, forming an n type-doped thin film at the upper part of the 3-D structure, forming a quantum dot over the n type-doped thin film, regrowing the 3-D structure in order to use the 3-D structure as an optical structure, and depositing a metal thin film at a vertex of the 3-D structure.

Forming the quantum dot over the n type-doped thin film may include forming the quantum dot over the n type-doped thin film may include forming the quantum dot in a heterostructure of III-nitride material which exhibits quantum confinement, for example, AlN/GaN/AlN or AlGaN/GaN/AlGaN in which gallium nitride (GaN) may be an active area using a nitride semiconductor. The quantum light emission of a communication wavelength band may be possible at room temperature or more using intersubband transition in a conduction band as an emission transition process of the quantum emitter.

Forming the 3-D structure on the substrate may include forming an n type-doped layer over the substrate, forming a mask over the n type-doped layer, and forming the 3-D structure using selective area growth by removing only a mark portion of a patterned area in the mask.

Forming the n type-doped thin film at the upper part of the 3-D structure may include generating an excess carrier by activating a dopant after the n type doping. A method of generating the excess carrier may include a thermal activation method. The n type-doped thin film formed at the upper part of the 3-D structure may function as a reservoir for providing a carrier when the carrier may be captured in the quantum dot through voltage application.

In forming the quantum dot over the n type-doped thin film, in the heterostructure, the AlN or AlGaN may function as a quantum barrier, the GaN may be an active area and subject to a 3-D quantum confinement effect depending on a geometric shape of the 3-D structure, and a material of the quantum barrier may form two or more intersubbands.

A thickness of the quantum barrier may be several nm to several tens of nm. The best condition of the thickness of the quantum barrier may include a thickness at which a carrier is not captured in the quantum dot by quantum tunneling before a carrier is captured in the quantum dot through voltage application, but may include a thickness at which quantum tunneling is possible at a specific voltage when a carrier is captured in the quantum dot through voltage application.

Forming the quantum dot over the n type-doped thin film may include growing the quantum dot using a difference in growth speed according to a crystal direction of the 3-D structure when growing a nitride semiconductor.

Regrowing the 3-D structure in order to use the 3-D structure as the optical structure may include controlling a far field pattern of light emitted from the quantum dot and increasing extraction efficiency to the outside of the 3-D structure.

Capturing the carrier in the quantum dot formed at the upper part of the structure by applying the voltage to the connected electrodes may include capturing an excess carrier or carrier from electron reservoir at fermi-energy level directly outside a semiconductor quantum dot in the quantum dot using quantum tunneling in the ground level of the intersubband by applying a voltage because a carrier needs to be present in the ground level of the intersubband in order to use intersubband transition of the quantum dot.

Capturing the carrier in the quantum dot formed at the upper part of the structure by applying the voltage to the connected electrodes may include capturing a single carrier or two carriers in the ground level of the intersubband within the conduction band of the quantum dot in response to the applied voltage.

A quantum emitter according to yet another embodiment includes a substrate, a three-dimensional (3-D) structure formed in the substrate, and a metal thin film deposited at a vertex of the 3-D structure after the 3-D structure may be regrown in order to use the 3-D structure as an optical structure. The 3-D structure may include an n type-doped thin film and a quantum dot formed in an active area over the n type-doped thin film.

In this case, the quantum emitter further includes an n type-doped layer over the substrate and a mask formed over the n type-doped layer. The 3-D structure may be formed using selective area growth by removing only a mark portion of a patterned area in the mask. Electrodes may be connected to the n type-doped layer and the metal thin film, respectively. A carrier may be captured in the quantum dot by applying a voltage to the connected electrodes. The quantum dot may be optically excited.

When the quantum dot is formed at the upper part of the n type-doped thin film, the quantum dot may be formed to have a heterostructure of AlN/GaN/AlN or AlGaN/GaN/AlGaN in which gallium nitride (GaN) may be the active area using a nitride semiconductor. The quantum light emission of a communication wavelength band may be possible at room temperature or more using intersubband transition in a conduction band as an emission transition process of the quantum emitter.

DETAILED DESCRIPTION

Figure 1:
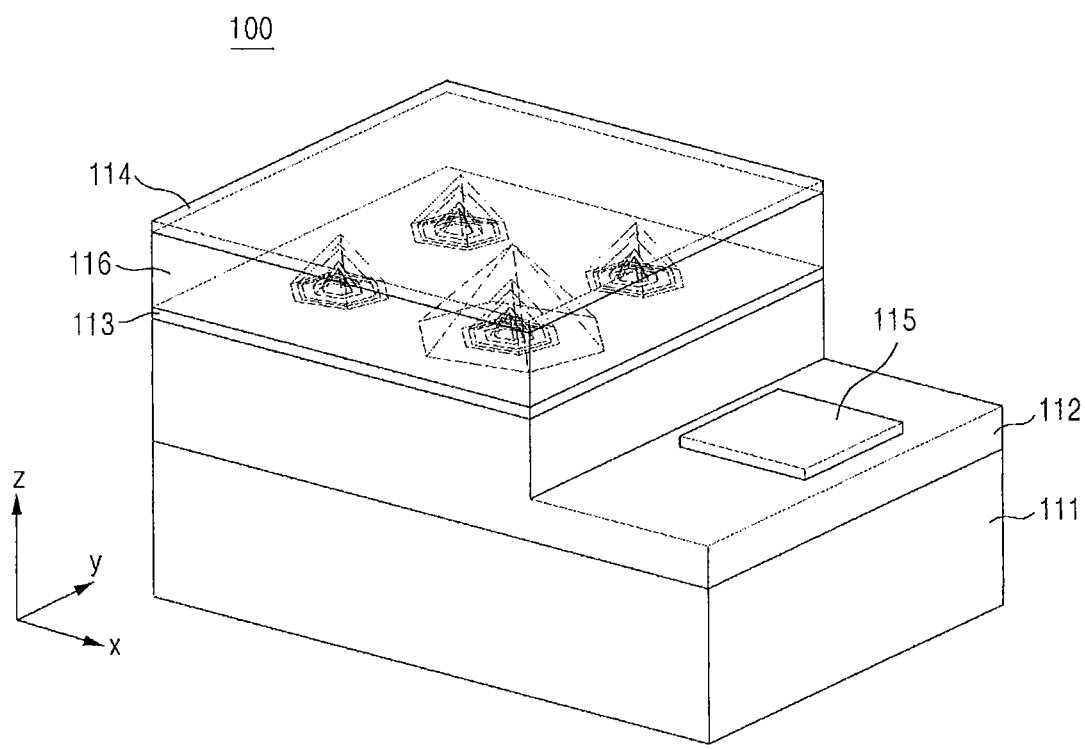
FIG. 1 is a perspective view schematically showing a quantum emitter according to an embodiment.

Hereinafter, embodiments of the present invention are described in detail with reference to the accompanying drawings. However, the described embodiments may be modified in other various forms, and the scope of the present invention is not restricted by the following embodiments. Furthermore, the embodiments of the present invention are intended to fully describe the present invention to a person having ordinary knowledge in the art to which the present invention pertains. In the drawings, the shapes, sizes, etc. of components in the drawings may be exaggerated to make the description clear.

The present invention provides a method of fabricating a quantum emitter capable of operating at room temperature in a communication wavelength band, wherein a 3-D structure of high deterministic quality is configured to reduce a non-emission transition probability in the emission of a quantum dot and the intersubband energy levels of the quantum dots are discontinuously defined at room temperature using a geometric shape of the 3-D structure not a common strain relaxation process.

Figure 2:
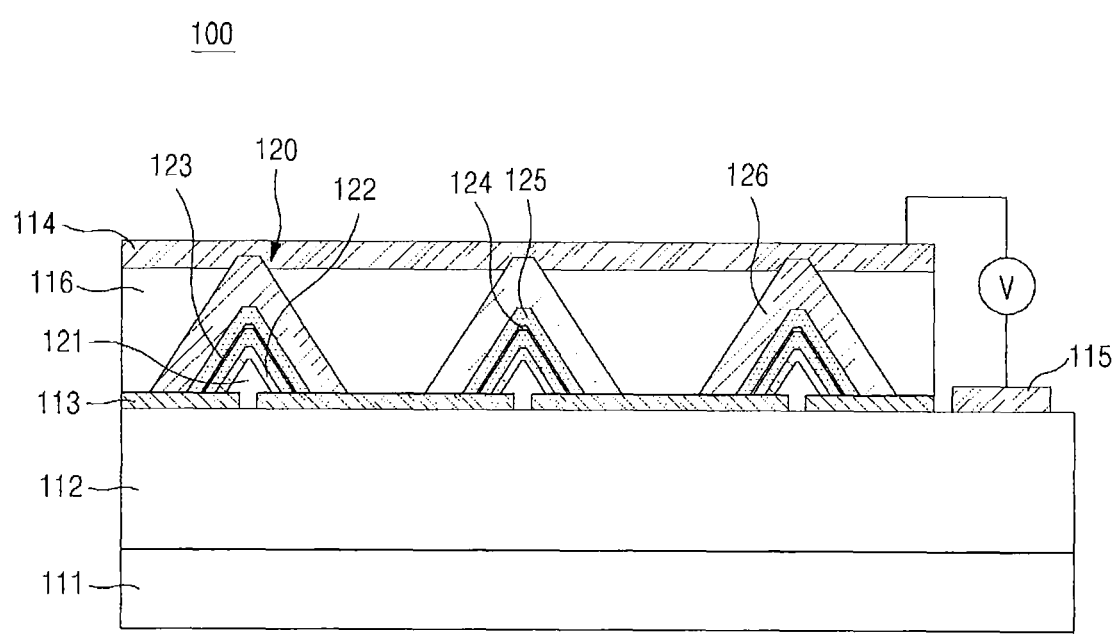
FIG. 2 is a cross-sectional view schematically showing the quantum emitter according to an embodiment.

FIG. 1 is a perspective view schematically showing a quantum emitter according to an embodiment. FIG. 2 is a cross-sectional view schematically showing the quantum emitter according to an embodiment.

Referring to FIGS. 1 and 2, the quantum emitter 100 according to an embodiment may include a substrate 111, a 3-D structure 120 and a metal thin film 114. In this case, each 3-D structure 120 may include a thin film 122 and a quantum dot 124. In some embodiments, the quantum emitter 100 may further include an n type-doped layer 112 on the substrate.

More specifically, in the quantum emitter 100 according to an embodiment, the 3-D structure 120 is formed over the substrate 111. The 3-D structure 120 may include the thin film 122 doped with an n type on an n type-doped core 121. Furthermore, the quantum dot 124 may be formed in an active area over an n type-doped thin film 122. In order for the 3-D structure 120 to be used as an optical structure, after the 3-D structure 120 is regrown (116), the metal thin film 114 may be deposited at the vertex of the 3-D structure 120.

The n type-doped layer 112 may be further included on the substrate 111. In this case, the 3-D structure 120 may be formed over the n type-doped layer 112.

More specifically, a mask 113 may be formed over the substrate 111 or on the n type-doped layer 112. The 3-D structure 120 may be formed using selective area growth for growing the 3-D structure by removing only the mask (113) portion of a patterned area.

The 3-D structure 120 may be grown based on the n type-doped core 121 by removing only the mask (113) portion of the patterned area. The n type-doped thin film 122 may be formed on the n type-doped core 121, and the quantum dot 124 may be formed over the n type-doped thin film 122. In this case, when the quantum dot 124 is formed over the n type-doped thin film 122, it may have a heterostructure of AlN/GaN/AlN or AlGaN/GaN/AlGaN in which gallium nitride (GaN) 123 is an active area using a nitride semiconductor. In this case, AlN or AlGaN may function as the quantum barrier 125, and the GaN 123 is an active area and subject to a 3-D quantum confinement effect depending on a geometric shape of the 3-D structure.

Electrodes may be connected to an n type-doped area and the metal thin film 114, respectively. A carrier may be captured in the quantum dot 124 by applying a voltage to the connected electrodes, and the quantum dot 124 may be optically excited. In this case, the n type-doped area may be an electrode 115 on the part of the n type-doped layer 112.

Figure 3:
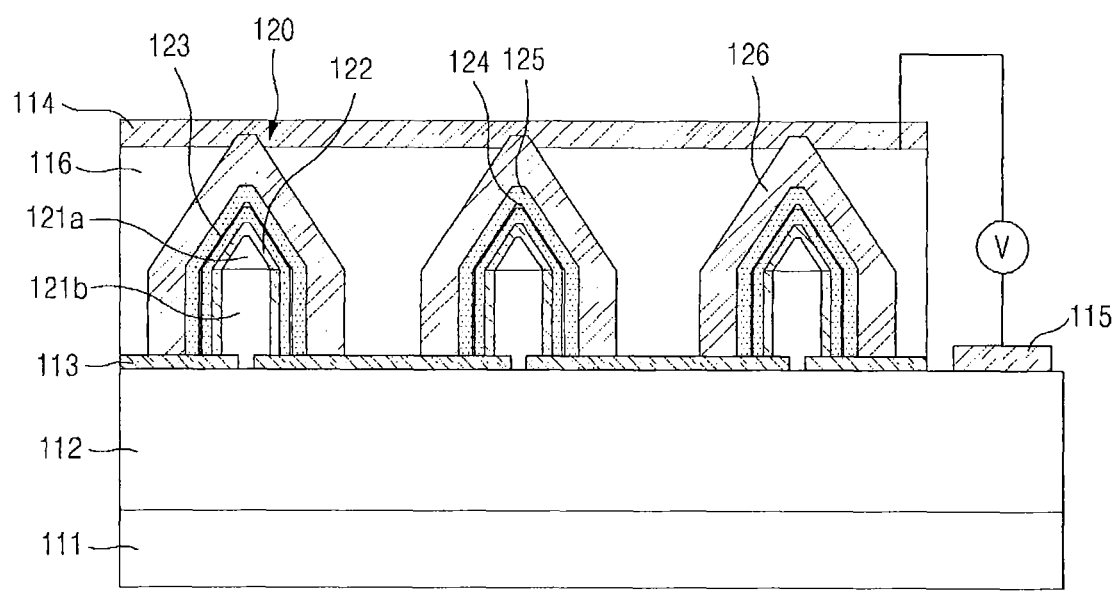
FIG. 3 is a cross-sectional view schematically showing a quantum emitter according to another embodiment.

FIG. 3 is a cross-sectional view schematically showing a quantum emitter according to another embodiment.

Referring to FIG. 3, the quantum emitter 100 according to another embodiment has the same elements as those shown in FIGS. 1 and 2, but is different from that of FIGS. 1 and 2 in a shape of the 3-D structure 120. In this case, the 3-D structure 120 has a hexagonal column shape having a top of a hexagonal pyramid. As described above, the 3-D structure 120 may have various shapes, which will be described more specifically later.

Figure 4:
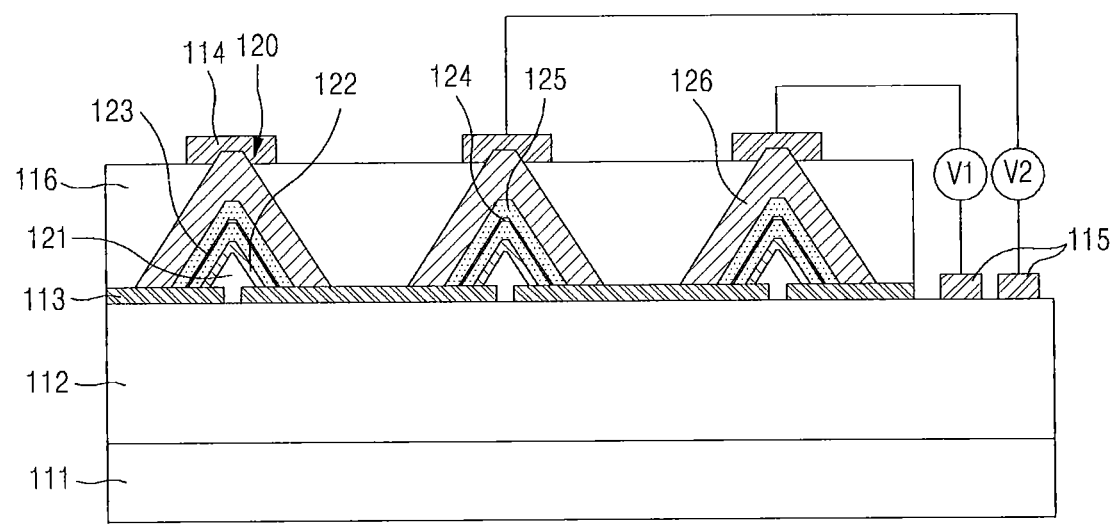
FIG. 4 is a cross-sectional view schematically showing a quantum emitter according to yet another embodiment.

FIG. 4 is a cross-sectional view schematically showing a quantum emitter according to yet another embodiment.

Referring to FIG. 4, the quantum emitter 100 according to yet another embodiment has the same elements as those shown in FIGS. 1 and 2. A metal thin film 114 deposited at the vertex of the 3-D structure 120 is not deposited on the entire regrowned 3-D structure 120, but may be deposited at the vertex of each of the 3-D structures 120. As described above, the metal thin film 114 may be deposited at the vertex of each of the 3-D structure 120. In this case, the metal thin films 114 may be connected to the electrode 115 on the part of the n type-doped area and applied with a voltage.

Hereinafter, the quantum emitter according to an embodiment is described more specifically.

The quantum emitter capable of operating at room temperature or more in a communication wavelength area is formed to have a heterostructure. The heterostructure may be formed by any III-Nitride material which may exhibit quantum confinement, such as e.g., AlN/GaN/AlN or AlGaN/GaN/AlGaN in which GaN is an active area, using a nitride semiconductor that belongs to semiconductor materials and has the greatest conduction band offset. Intersubband transition in the conduction band may be used as an emission transition process of the quantum emitter.

The heterostructure of the quantum emitter is fabricated using a geometric structure of the 3-D structure through a thin film deposition method. The thin film deposition method may include metal organic chemical vapor deposition (MOCVD) and MBE.

The 3-D structure is fabricated using selective area growth for growing the 3-D structure by removing only the mark portion of a patterned area and may be provided in a geometric shape that may have a quantum dot having a 3-D quantum confinement effect.

For example, a 3-D structure having an inverted pyramid shape of a hexagonal pyramid may include an inverted pyramid shape of a ring-shaped pattern or circular pattern by concave mode growth from selective area growth according to a combined form of triangles in a bottom-up method. Furthermore, the 3-D structure may include an inverted pyramid shape of a circular pattern by wet etching in a top-down method.

Figure 5:
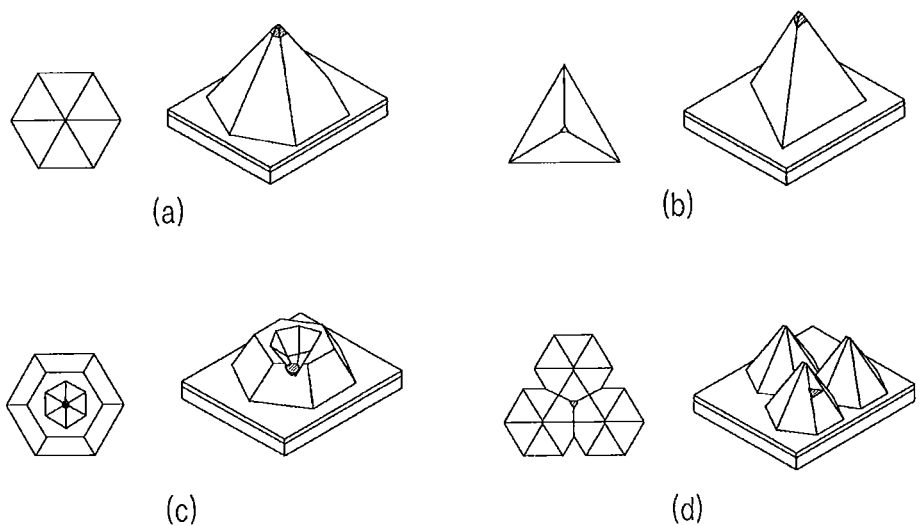
FIG. 5 illustrates 3-D structures according to embodiments.
Figure 6:
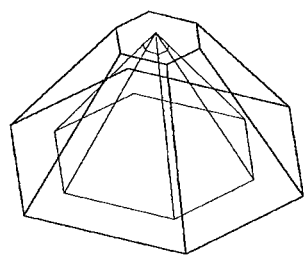
FIG. 6 illustrates the structures of the tips of 3-D structures according to embodiments.
Figure 6:
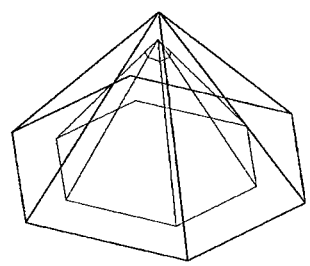

FIG. 5 illustrates 3-D structures according to embodiments. Furthermore, FIG. 6 illustrates the structures of the tips of 3-D structures according to embodiments.

For example, the 3-D structure may have a hexagonal pyramid, a triangular pyramid, a hexagonal column having a top of a hexagonal pyramid or an inverted pyramid shape of a hexagonal pyramid, and may also include a combined form of all of the shapes.

In other words, the 3-D structure may have a hexagonal pyramid shape as shown in FIG. 5a or may have a triangular pyramid shape as shown in FIG. 5b. Furthermore, the 3-D structure may have an inverted pyramid shape of a hexagonal pyramid as shown in FIG. 5c or may have an inverted shape of a hexagonal pyramid. Furthermore, the 3-D structure may have a plurality of hexagonal pyramids shape as shown in FIG. 5d. Furthermore, the 3-D structure may have various shapes, such as a hexagonal column shape having a top of a hexagonal pyramid and a triangular column shape having a top of a triangular pyramid, and is not limited to any shape.

Furthermore, as shown in FIG. 6a, the 3-D structure may include a structure having the end truncated with respect to the aforementioned structure. As shown in FIG. 6b, the 3-D structure may have a shape having one vertex not a truncated structure. As described above, the 3-D structure may have a different capping shape although it has the same shape.

Furthermore, the material of the substrate may include silicon (Si), sapphire ($Al_2O_3$), silicon carbide (SiC), or gallium lithium oxide ($LiGaO_3$), and has no limits to its crystal direction. A material to be deposited on the substrate may include gallium nitride (GaN) doped with an n type, aluminum nitride (AlN) doped with an n type, or aluminum gallium nitride ($Al_xGa_{1-x}N$), that is, a compound of them.

The material of the mask for the selective area growth method has growth selectivity from opened area to mask, such as silicon dioxide ($SiO_2$) or silicon nitride ($Si_3N_4$). A thickness of the mask may be nm to 200 nm or more which can prohibit breakdown phenomena applying voltage.

Figure 7:
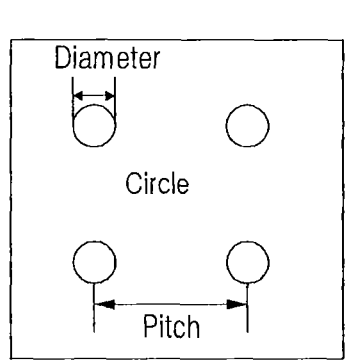
FIG. 7 illustrates patterns used for selective area growth according to embodiments.
Figure 7:
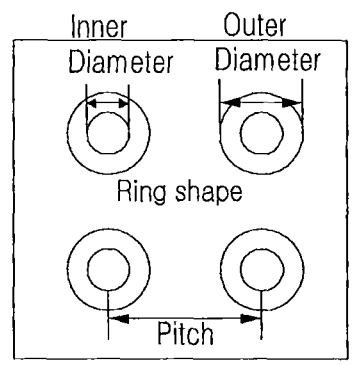
Figure 7:
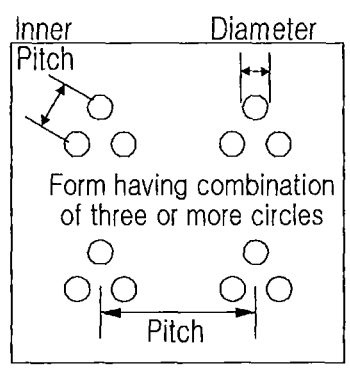
Figure 7:
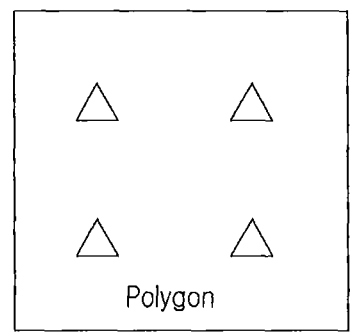

FIG. 7 illustrates patterns used for selective area growth according to embodiments.

An n type-doped layer may be formed on the substrate, and the mask may be formed on the n type-doped layer. Furthermore, a 3-D structure may be formed using selective area growth by removing only a mark portion of a patterned area in the mask.

As shown in FIG. 7, when the 3-D structure is formed in the substrate using selective area growth, a selective area may have a circle (a), a ring shape (b), a shape (c) in which three or more circles are combined or a polygon (d) having a shape of more than a triangle, for example, and may also include a combined shape of them.

The size of the selective area for a single structure may be several tens of nm to several μm. In the case of a ring shape, the diameter of an outer circle may be several hundreds of nm to 20 μm and the diameter of an inner circle may be several tens of nm to 20 μm. The selective area may have a randomly combined shape within the size range.

Furthermore, for the operation of a single quantum emitter, the interval between the selective areas must be the diffraction limit or more of a measurement lens in 1.55 μm, that is, a communication wavelength. The size of the interval may be about 1 μm or more.

If a 3-D structure doped with an n type is formed in the substrate using the selective area growth method, the material of the 3-D structure may include III-nitride material, for example, AlGaN or AlN in addition to GaN. III-Nitride material may be doped with an n type. Also, III-Nitride material may exhibit quantum confinement.

Furthermore, if an n type-doped III-nitride thin film such as AlGaN or AlN is formed over a 3-D structure. The thin film may have a size of several nm to several hundreds of nm and may have a doping level of $10^{18}/cm^3$ to $10^{20}/cm^3$ which may act as electron reservoir.

If a 3-D structure is regrown in order to use it as an optical structure, the 3-D structure may have a material of GaN, AlGaN or AlN and may have a thickness of several tens of nm to several μm.

If a metal thin film is deposited on top of a 3-D structure, the metal thin film may have a thickness of several tens of nm which dimension can act as electrode.

In this case, in order to prevent the metal thin film from being broken due to the 3-D structure, a step may be reduced by accumulating a polymer layer through spin coating. In this case, the thickness of the polymer is determined based on the size of the 3-D structure and may be several tens of nm to several μm. Furthermore, hydrogen silsesquioxane, polymethyl methacrylate, SU-8 or photoresist (MaN 2407, added) may be used as the type of polymer.

As a preparation process for intersubband transition, carriers must be present in the ground level of the intersubband so as to use the intersubband transition of a semiconductor quantum dot. Accordingly, a principle in which an excess carrier outside the quantum dot is captured in a GaN intersubband ground level using a quantum tunneling mechanism through voltage application is used.

Furthermore, if a carrier is captured in the quantum dot by applying a voltage, a single carrier or two carriers may be captured in the ground level of the intersubband within a quantum dot conduction band in response to the applied voltage. The process of applying a voltage may be a process of continuously applying a voltage or a process of applying a voltage in a pulse form.

As a method for the intersubband transition, carriers in the ground level may be optically excited into a first excited energy level. Furthermore, the carriers in the first excited energy level may be optically excited into a second excited energy level through a modification of a geometric shape of a quantum dot.

Furthermore, if the quantum dot is optically excited, a excitation light source may be a continuous laser or a pulse laser. The time interval between the pulses may be longer than the emissive discharge lifetime of intersubband transition.

In this case, the excited light energy may be the same as an energy difference between the ground level of the conduction band intersubband and the first excited state or may be the same as the sum of the energy difference and longitudinal optical phonon energy of GaN. Furthermore, the excited carrier relax its energy into the first excited state.

In this case, an object lens or a macro lens may be used to optically excite only a single quantum dot and collect emission from quantum dot.

Improved excitation efficiency compared to a plan structure can be expected through the optical structure layer according to an embodiment of the present invention.

The quantum emitter according to an embodiment may be formed by the following method of fabricating a quantum emitter. The elements of a quantum emitter, a method of fabricating the quantum emitter, and an operating method of the quantum emitter according to embodiments are described more specifically below.

Figure 8:
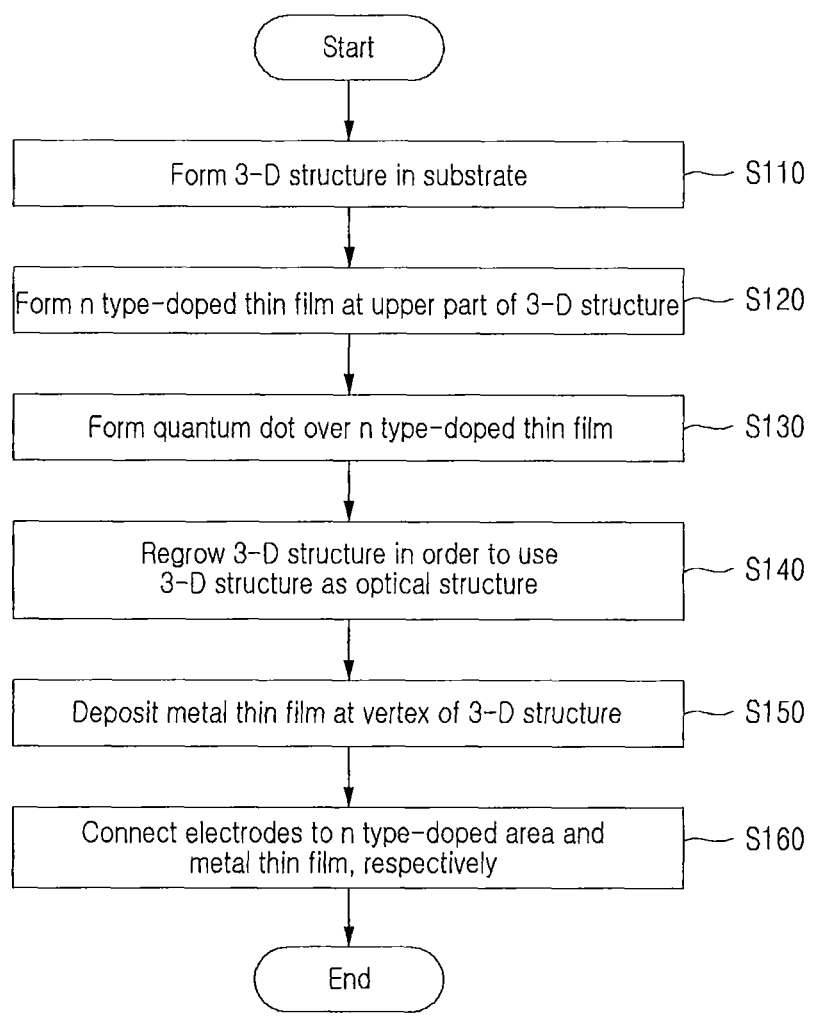
FIG. 8 is a flowchart illustrating a method of fabricating a quantum emitter according to an embodiment.

FIG. 8 is a flowchart illustrating a method of fabricating a quantum emitter according to an embodiment.

Referring to FIG. 8, the method of fabricating a quantum emitter according to an embodiment includes step S110 of forming a 3-D structure in a substrate, step S120 of forming an n type-doped thin film at the upper part of the 3-D structure, step S130 forming a quantum dot over the n type-doped thin film, step S140 of regrowing the 3-D structure in order to use the 3-D structure as an optical structure, step S150 of depositing a metal thin film at the vertex of the 3-D structure, and step S160 of connecting electrodes to an n type-doped area and the metal thin film, respectively. A carrier may be captured in the quantum dot by applying a voltage to the connected electrodes. In this case, the quantum dot may be optically excited to drive the quantum emitter.

An embodiment of the present invention may provide a method of fabricating a quantum emitter capable of operating at room temperature in 1.55 µm, that is, an optical communication wavelength band. The method of fabricating the quantum emitter based on a nitride semiconductor according to an embodiment of the present invention enables the quantum light emission of the communication wavelength band at room temperature or more through intersubband transition within a conduction band using a high conduction band offset of a nitride-based heterostructure.

Furthermore, unlike a semiconductor quantum dot randomly generated with a specific size and shape distribution using the existing strain relaxation mechanism, the quantum dot according to an embodiment may be fabricated to have a geometric shape of the vertex of a 3-D structure, such as a pyramid. This enables engineering for the energy structure of a single semiconductor quantum dot, and can tune an emission wavelength for intersubband transition to 1.55 µm, that is, a communication wavelength. Furthermore, the emission wavelength may be easily changed depending on use purposes.

Hereinafter, the steps of the method of fabricating a quantum emitter according to an embodiment are illustrated more specifically below.

In step S110, the 3-D structure may be formed in the substrate.

In the step of forming the 3-D structure in the substrate, after an n type-doped layer is formed on the substrate, a mask may be formed on the n type-doped layer. Furthermore, after only the mark portion of a patterned area is removed in the mask, the 3-D structure may be formed using selective area growth.

For example the 3-D structure may have one or more of a hexagonal pyramid, a triangular pyramid, a hexagonal pyramid having a top of a hexagonal column, and an inverted pyramid shape of a hexagonal pyramid.

Specifically, the 3-D structure having an inverted pyramid shape of the hexagonal pyramid may have an inverted pyramid shape of a ring-shaped pattern or circular pattern by concave mode growth from selective area growth according to a combined form of triangles in a bottom-up method or may have an inverted pyramid shape of a circular pattern by wet etching in a top-down method.

The substrate may be made of at least one of silicon (Si), sapphire ($Al_2O_3$), silicon carbide (SiC), gallium lithium oxide ($LiGaO_3$) and III-nitride material. The n type-doped layer deposited on the substrate may be made of at least one of gallium nitride (GaN), aluminum nitride (AlN), and aluminum gallium nitride ($Al_xGa_{1-x}N$) doped with an n type.

Furthermore, if the n type-doped area is the substrate or an n type-doped layer deposited on the substrate, a core forming the 3-D structure may be made of at least one substance of gallium nitride (GaN), aluminum nitride (AlN), and aluminum gallium nitride ($Al_xGa_{1-x}N$) doped with an n type.

If the core forming the 3-D structure is made of aluminum gallium nitride ($Al_xGa_{1-x}N$) doped with an n type, an n type doping level is determined based on aluminum content within aluminum gallium nitride ($Al_xGa_{1-x}N$). After the n type doping, an excess carrier may be generated by activating a dopant. A method of generating the excess carrier may be thermal activation. In some exemplary embodiments, a core forming the 3-D structure may be made of III-nitride material doped with an n type. The n type doping level of III-nitride material may be determined based on an applied voltage for performing quantum tunneling. After the n type doping, additional dopant activation process may be conducted to generate excess carriers. The applied voltage may be suitably determined as a feasible value based on a specification of device for applying volatage.

Figure 9:
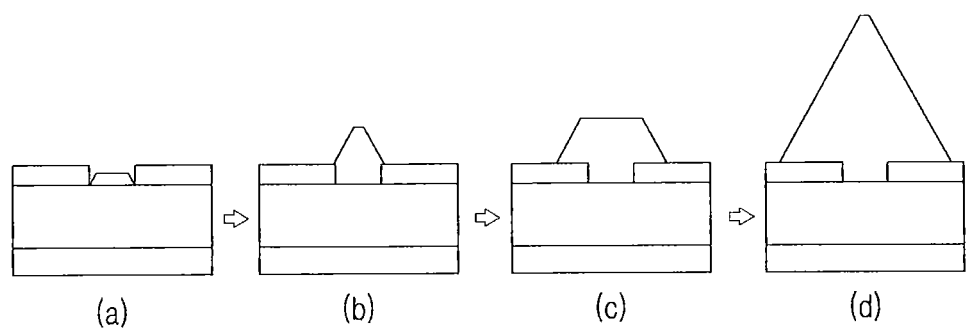
FIGS. 9 and 10 are diagrams for illustrating a process of forming the core of the 3-D structure according to an embodiment.
Figure 10:
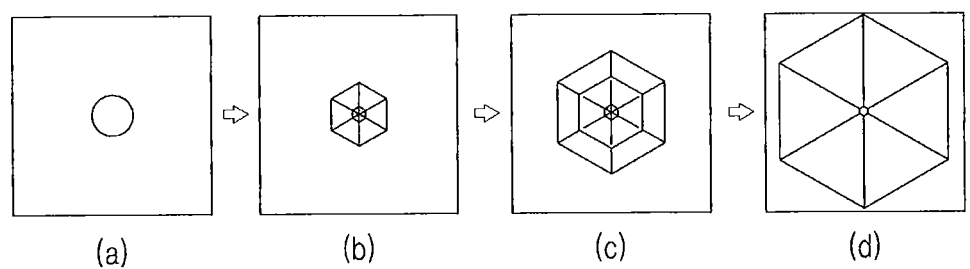

FIGS. 9 and 10 are diagrams for illustrating a process of forming the core of a 3-D structure according to an embodiment. In an example of the present invention, referring to FIGS. 9 and 10, step S110 of forming the 3-D structure in the substrate may include a seed growth step, a step of controlling a vapor phase growth rate and surface migration growth rate, a lateral overgrowth step, and self-limited growth in order to obtain a 3-D high-quality crystalline structure.

The steps are illustrated more specifically below.

For example, in the seed growth step, a growth temperature may be identical with or lower than a growth temperature of a main 3-D structure, and the 3-D structure according to an embodiment may be different from a 3-D structure core in the source amount of a group 3 element versus a group 5 element. Furthermore, a defect structure occurring in a nitride-based substrate can be partially removed by providing an efficient growth site in the selective growth method, and the uniformity of the structure within a patterned area can be improved. For example, regarding the step of controlling a vapor phase growth rate and surface migration growth rate, in the selective area growth method, crystallization is first performed in an area boundary surface open by surface migration because the surface migration growth rate is much faster than the vapor phase growth rate. In this case, crystals at the boundary portion may be aggregated to form a 3-D structure, so a crystal defect may occur. Accordingly, a defect structure in the 3-D structure can be removed through homogeneous growth in the entire open area by controlling the ratio of the vapor phase growth rate and the surface migration growth rate through control of a selective area size and interval.

The lateral overgrowth step means that lateral crystal growth is performed with respect to the open area of the mask in the selective area growth method. In this case, a defect structure occurring from the n type substrate switches to a lateral crystal growth direction, so the upper part of the 3-D structure is free from the defect structure.

The self-limited growth step is to limit a geometric structure by thermodynamic stability so that the 3-D structure can form a quantum dot. In the case of a pyramid structure, this step functions to make the area of a vertex portion a size level (20 nm) of a quantum dot.

For example, in the case of a hexagonal pyramid, in the self-limited growth step, the area of the vertex portion of the pyramid is a variable proportional to the diffusion length of Ga adatoms. If MOCVD is used as a method of changing the area, it may include pressure, a temperature, a composition ratio of hydrogen and nitrogen of carrier gas, and control of the ratio of a group 3 and 5 source.

In one embodiment of the present invention, step S110 of forming the 3-D structure in the substrate is to extend the direction in which crystals are formed in the 3-D and functions to relax strain generated from the substrate. If a high-quality quantum dot is formed over an n type-doped thin film, the effect of an internal strong electric field attributable to a piezoelectric effect due to lattice constant mismatch can be reduced.

For example, if a quantum dot is formed at the vertex of a hexagonal pyramid, the influence of an electric field can be reduced by a strain relaxation process although the electric field attributable to a great piezoelectric effect in the (0001) direction of GaN is strong.

For another example, if a quantum dot is formed with respect to an inverted hexagonal pyramid, a quantum dot may be formed based on a semi-polar facet including {101-1} and {112-2} having a small piezoelectric effect in a crystalline structure of GaN so that a (0001) area is not formed in the self-limited growth step in a bottom-up method.

In step S120, the n type-doped thin film may be formed at the upper part of the 3-D structure. In this case, after the n type doping, an excess carrier is generated by activating a dopant. A method of generating the excess carrier may be a thermal activation method.

In an embodiment of the present invention, step S120 of forming the n type-doped thin film at the upper part of the 3-D structure may be omitted if the 3-D structure is doped with an n type in step S110 of forming the 3-D structure in the substrate, but cannot be omitted in some cases. In some cases, in the case of n type GaN, step S120 cannot be omitted because quantum tunneling may not occur when a carrier is captured in a quantum dot through voltage application.

In an example of the present invention, step S120 of forming the n type-doped thin film at the upper part of the 3-D structure may function as a reservoir that provides a carrier when the carrier is captured in a quantum dot through voltage application.

In step S130, the quantum dot may be formed over the n type-doped thin film. When the quantum dot is formed over the n type-doped thin film, it may be formed to have a heterostructure of AlN/GaN/AlN or AlGaN/GaN/AlGaN in which gallium nitride (GaN) is an active area using a nitride semiconductor. Accordingly, the quantum light emission of a communication wavelength band may be possible at room temperature or more using intersubband transition in a conduction band as the emission transition process of the quantum emitter.

In this case, basically, AlN or AlGaN functions as a quantum barrier based on the heterostructure of an AlN/GaN/AlN or AlGaN/GaN/AlGaN shape, and is subject to a 3-D quantum confinement effect depending on a geometric shape of the 3-D structure in which GaN is an active area. In the heterostructure, the material of the quantum barrier may include AlGaN only when two or more intersubbands are formed an emission wavelength through intersubband transition is a communication wavelength band.

For example, the thickness of the quantum barrier may be several nm to several tens of nm. The thickness may have the best condition in which a carrier is not captured in the GaN quantum dot by quantum tunneling before a carrier is captured in the quantum dot through voltage application, but may be a thickness at which quantum tunneling is possible at a specific voltage when a carrier is captured in the quantum dot through voltage application.

For example, in the step of growing the GaN quantum dot, the GaN quantum dot is grown using a difference in the growth speed according to the crystalline direction of the 3-D structure when the nitride semiconductor is grown. For example, in the case of a pyramid structure, the growth speed in the z crystal direction of (0001) and the growth speed in a semi-polar facet are slow. Accordingly, when the thin film is formed in the 3-D structure, the growth speed of the pyramid structure is fast because the vertex of the pyramid is the z direction. As a result, a 3-D quantum confinement effect is effectively applied to the vertex of the pyramid because the GaN thin film layer is grown, but the semi-polar facet is thinly grown.

For example, the step of growing the GaN quantum dot may include a growth condition different from that used in a 3-D structure forming process and include all of variables described in the 3-D structure forming process because the step extremely limits the growth speed of the semi-polar facet.

When the quantum dot is formed over the n type-doped thin film, the quantum dot may be grown using a difference in the growth speed according to the crystal direction of the 3-D structure when the nitride semiconductor is grown.

In step S140, the 3-D structure may be regrown in order to use it as an optical structure. In this case, a far field pattern of light emitted from the quantum dot may be controlled, and extraction efficiency toward the outside of the 3-D structure may be increased.

In step S150, the metal thin film may be deposited at the vertex of the 3-D structure. In this case, a step may be reduced by accumulating a polymer layer through spin coating in order to prevent the metal thin film from being broken by the 3-D structure.

In step S160, electrodes may be connected to the n type-doped area and the metal thin film, respectively.

Thereafter, when a voltage is applied to the connected electrodes, carriers may be captured in the quantum dot. In order to use the intersubband transition of the semiconductor quantum dot, carriers must be present in the ground level of the intersubband. For this, an excess carrier outside the quantum dot may be captured in the quantum dot through quantum tunneling in the intersubband ground level by applying a voltage. In this case, a single carrier or two carriers may be captured in the ground level of the intersubband within the conduction band of the quantum dot when the voltage is applied.

As described above, the quantum emitter may be driven by optically exciting the quantum dot of the fabricated quantum emitter.

Figure 11:
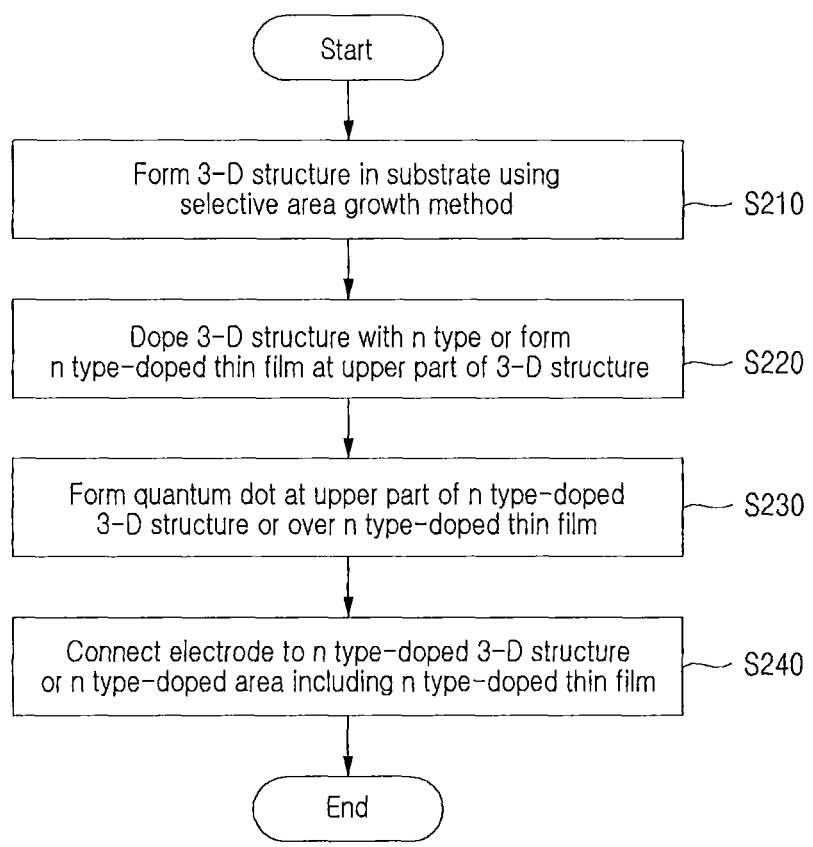
FIG. 11 is a flowchart illustrating a method of fabricating a quantum emitter according to another embodiment.

FIG. 11 is a flowchart illustrating a method of fabricating a quantum emitter according to another embodiment.

Referring to FIG. 11, the method of fabricating a quantum emitter according to another embodiment includes step S210 of forming a 3-D structure in a substrate using a selective area growth method, step S220 of doping the 3-D structure with an n type or forming an n type-doped thin film at the upper part of the 3-D structure, step S230 of forming a quantum dot at the upper part of the n type-doped 3-D structure or over the n type-doped thin film, and step S240 of connecting an electrode to the n type-doped 3-D structure or an n type-doped area including the n type-doped thin film. A carrier may be captured in the quantum dot by applying a voltage to the connected electrode. In this case, the quantum emitter may be driven by optically exciting the quantum dot.

In the step of forming the quantum dot at the upper part of the n type-doped 3-D structure or over the n type-doped thin film, the quantum dot is formed to have a heterostructure of AlN/GaN/AlN or AlGaN/GaN/AlGaN in which gallium nitride (GaN) is an active area using a nitride semiconductor. This may enable the quantum light emission of a communication wavelength band at room temperature or more using intersubband transition in a conduction band as the emission transition process of the quantum emitter.

The method of fabricating a quantum emitter according to another embodiment may include the same element as that of the method of fabricating a quantum emitter according to an embodiment of FIG. 8, and a redundant description thereof is omitted.

The method of fabricating a quantum emitter according to another embodiment may be used to fabricate a quantum emitter capable of operating at room temperature in 1.55 μm, that is, an optical communication wavelength band, with respect to a substrate that has not been doped, in addition to the substrate. In this case, after a 3-D structure is doped with an n type or a non-doped 3-D structure is formed, an n type-doped thin film may be formed at the upper part of the 3-D structure and an electrode may be directly connected to the n type-doped thin film.

Figure 12:
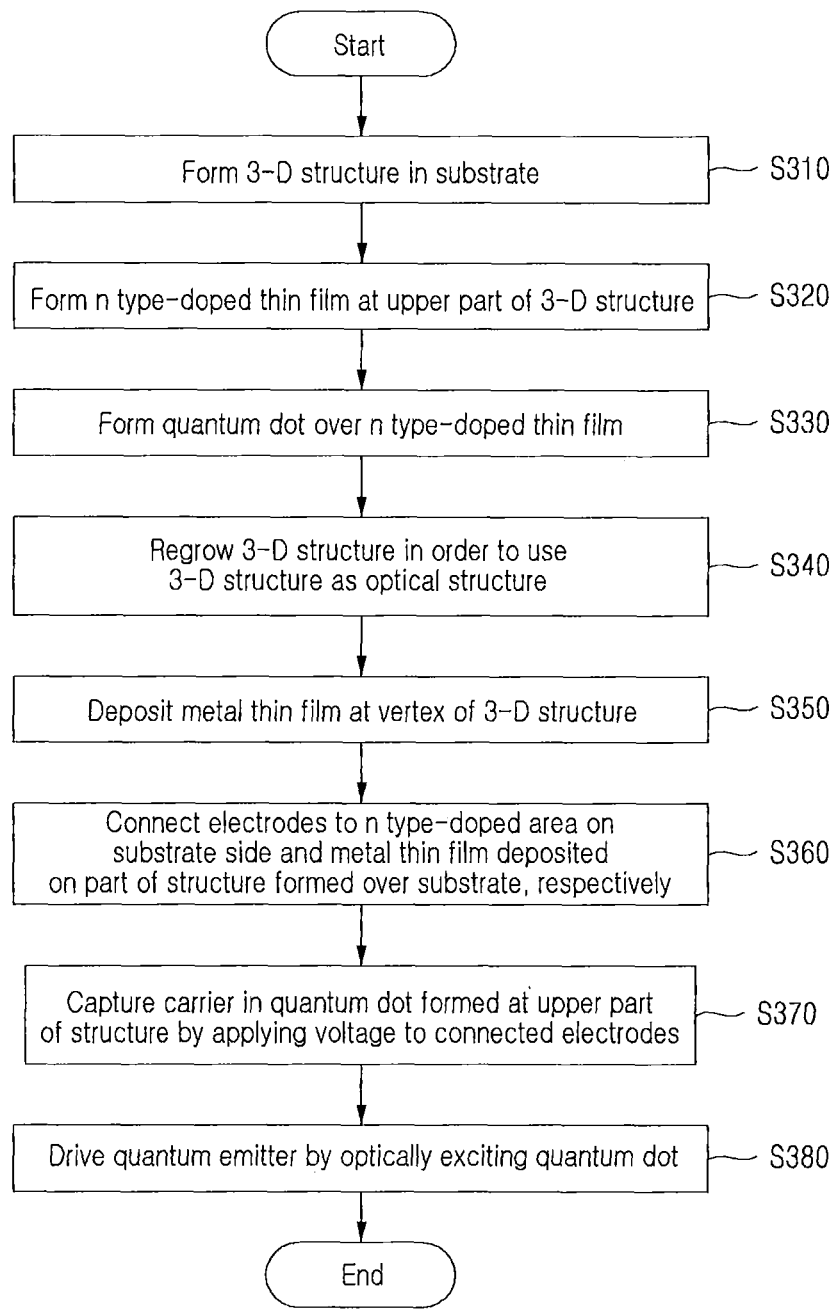
FIG. 12 is a flowchart illustrating an operating method of a quantum emitter according to yet another embodiment.

FIG. 12 is a flowchart illustrating an operating method of the quantum emitter according to yet another embodiment. Referring to FIG. 12, the operating method of the quantum emitter according to yet another embodiment may include step S360 of connecting electrodes to the n type-doped area on the substrate side and the metal thin film deposited on the part of the structure formed over the substrate, respectively, step S370 of capturing carriers in the quantum dot formed at the upper part of the structure by applying a voltage to the connected electrodes, and step S380 of driving the quantum emitter by optically exciting the quantum dot.

Hereinafter, the steps of the operating method of the quantum emitter according to yet another embodiment are illustrated more specifically. The operating method of the quantum emitter according to yet another embodiment may include the same steps as the method of fabricating the quantum emitter according to an embodiment described with reference to FIG. 8, and thus a redundant description thereof is omitted.

In step S360, the electrodes may be connected to the n type-doped area on the substrate side and the metal thin film deposited on the part of the structure formed over the substrate, respectively.

In step S370, carriers may be captured in the quantum dot formed at the upper part of the structure by applying a voltage to the connected electrodes. A carrier must be present in the ground level of an intersubband in order to use the intersubband transition of the semiconductor quantum dot. Accordingly, an excess carrier outside the quantum dot may be captured in the quantum dot using quantum tunneling in the ground level of the intersubband through voltage application. In this case, a single carrier or two carriers may be captured in the ground level of the intersubband within the conduction band of the quantum dot in response to the applied voltage.

In step S380, the quantum emitter may be driven by optically exciting the quantum dot.

Prior to step S360, step S310 of forming the 3-D structure in the substrate, step S320 of forming the n type-doped thin film at the upper part of the 3-D structure, step S330 of forming the quantum dot over the n type-doped thin film, step S340 of regrowing the 3-D structure in order to use the 3-D structure as an optical structure, and step S350 of depositing the metal thin film at the vertex of the 3-D structure may be performed.

In accordance with an embodiment of the present invention, multiple quantum emitters can be uniformly fabricated in a large area of a single wafer at once through the design of a selective area because a single quantum dot is formed in a single 3-D structure based on selective area growth. Furthermore, a subsequent process, such as an optical waveguide, can be easily performed on a single quantum dot because the location of the quantum dot is determined by the 3-D structure.

Furthermore, in accordance with an embodiment of the present invention, since intersubband transition is used as an emission source, inter-band transition and emission wavelength of the heterostructure of a 2-D thin film shape accumulated in a 3-D structure are different. Accordingly, high-purity quantum light can be obtained although the method of the present invention is a method of forming the semiconductor quantum dot based on the thin film formed in the 3-D structure.

Embodiments of the present invention relate to the fabrication of the quantum emitter capable of operating at room temperature in an optical communication wavelength band using the semiconductor quantum dot and an operating method of the quantum emitter. More specifically, embodiments of the present invention can provide a deterministic quantum emitter capable of operating at room temperature or more by forming the intersubband of an optical communication wavelength band using the method of fabricating a quantum dot using a 3-D structure based on a nitride semiconductor and implementing intersubband transition as an emission process through a single carrier capture technology, and an operating method of the deterministic quantum emitter.

In accordance with an embodiment of the present invention, the deterministic quantum emitter capable of operating at room temperature in an optical communication wavelength band, which has not been implemented in a conventional technology, can be fabricated based on a difference in the method of fabricating a semiconductor quantum dot, the use of unique material properties of a nitride semiconductor only, the principle that the emission process of a quantum dot intersubband transition having an optical communication wavelength is enabled, and the implementation of high extraction efficiency of the quantum emitter using the 3-D structure.

First, regarding the difference in the method of fabricating a semiconductor quantum dot, unlike in quantum dots fabricated to have randomness through strain relaxation in the existing thin film deposition method, the method of fabricating the quantum dot using the structure has a great advantage in terms of the process in subsequently fabricating a quantum emitter because selective area growth is performed by applying the self-limited principle and the quantum dot can be selectively fabricated depending on the position in a wafer scale. Furthermore, the intersubband emission wavelength of a quantum dot must be able to be controlled in order to accurately match an optical communication wavelength. In the method of fabricating a quantum dot using the self-limited principle according to an embodiment of the present invention, an optical communication wavelength can be matched with respect to most of quantum dots in a wafer scale because the size of the quantum dot can be finely tuned.

Furthermore, if a unique material property of a high band offset inherent in a nitride semiconductor is used, a quantum emitter can be fabricated, which has both high thermal stability and an optical communication wavelength at room temperature in quantum dot intersubband transition that is impossible by material properties themselves in other compound semiconductor groups.

Furthermore, if single carrier capture is used as the principle to enable the emission process of quantum dot intersubband transition having an optical communication wavelength, a single carrier can be actively captured through quantum tunneling compared to a case where carriers are randomly captured through high-level doping for the emission process of intersubband transition in a conventional technology. Unlike in the existing method, the single carrier captured as described above has stability as a light source because the carrier has long lifespan within a quantum dot. Furthermore, a non-emission process can be suppressed in intersubband transition and emission efficiency can be improved because a carrier is present in an intersubband energy level only.

Furthermore, compared to a quantum dot fabricated using the existing strain relaxation method, a quantum emitter having high extraction efficiency can be fabricated through the optical effect of the 3-D structure.

Accordingly, the quantum emitter capable of operating at room temperature in an optical communication wavelength band according to an embodiment of the present invention may be used for the security field as a quantum password and the quantum computer field based on linear optics.

In accordance with an embodiment of the present invention, the quantum light emission of a communication wavelength band at room temperature or more is made possible using intersubband transition within a conduction band belt based on a high conduction band offset of the nitride-based heterostructure.

In accordance with an embodiment of the present invention, unlike a semiconductor quantum dot randomly generated with a specific size and shape distribution using the existing strain relaxation mechanism, the semiconductor quantum dot can be fabricated to have the same geometric shape as the vertex of the 3-D structure, such as a pyramid. This enables engineering for the energy structure of a single semiconductor quantum dot, and can tune an emission wavelength for intersubband transition to 1.55 μm, that is, a communication wavelength. Furthermore, the emission wavelength can be easily changed depending on use purposes.

In accordance with an embodiment of the present invention, an electric field can be changed based on a nitride-based strong piezoelectric effect because a strain profile can be changed by changing the structure. Accordingly, a high transition probability can be obtained by implementing high spatial overlap between wave functions through the modulation of an electron wave function in which a carrier is present in a band. As a result, an operating speed can be controlled and changed depending on use purposes.

In accordance with an embodiment of the present invention, multiple quantum emitters can be uniformly fabricated in a large area of a single wafer at once through the design of a selective area because a single quantum dot is formed in a single 3-D structure based on selective area growth.

In accordance with an embodiment of the present invention, a subsequent process, such as an optical waveguide, can be easily performed on a single quantum dot because a single quantum dot is formed in a single 3-D structure based on selective area growth and thus the location of a quantum dot is determined by the 3-D structure.

In accordance with an embodiment of the present invention, since a single quantum dot is formed in a single 3-D structure based on selective area growth, a high-quality semiconductor quantum dot having a high-quality crystalline structure can be fabricated at the vertex of the 3-D structure by partially blocking threading dislocation and changing the progress direction of a defect in a growth method.

In accordance with an embodiment of the present invention, since intersubband transition is used as an emission source, inter-band transition and emission wavelength of the heterostructure of a 2-D thin film shape accumulated in the 3-D structure are different. Accordingly, high-purity quantum light can be obtained although the method of the present invention is a method of forming a semiconductor quantum dot based on a thin film formed in a 3-D structure.

In accordance with an embodiment of the present invention, light extraction efficiency can be increased compared to a common 2-D film shape because an optical effect of the 3-D structure is obtained. Furthermore, a loss in coupling with an optical waveguide inside a chip or coupling with an optical fiber outside a chip can be significantly reduced because light emission directivity can be controlled. As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents. In some exemplary embodiments, the 3-D structure may be made of Indium gallium nitride ($In_xGa_{1-x}N$) doped with the n type rather than aluminum gallium nitride ($Al_xGa_{1-x}N$). In other words, $Al_xGa_{1-x}N$ described above may be substituted by $In_xGa_{1-x}N$. Also, both of $In_xGa_{1-x}N$ and $Al_xGa_{1-x}N$ may be used to form the 3-D structure. Moreover, any III-Nitride material which may exhibit quantum confinement may be used to form the 3-D structure, i.e., the 3-D structure may be made of any III-Nitride materials.

III-Nitride material(s) described above may be binary compound(s), tenary compound(s), quaternary compound(s) or any combination thereof.

Accordingly, other implementations, other embodiments, and the equivalents of the claims belong to the scope of the claims.

What is claimed is:

1. An operating method of a quantum emitter comprising:
   connecting electrodes to an n type-doped area on a substrate side and a metal thin film deposited on a structure side formed over the substrate, respectively;
   capturing a carrier in a quantum dot formed at an upper part of the structure by applying a voltage to the connected electrodes;
   driving the quantum emitter by optically exciting the quantum dot:
   forming a three-dimensional (3-D) structure in the substrate;
   forming an n type-doped thin film at an upper part of the 3-D structure;
   forming a quantum dot over the n type-doped thin film;

regrowing the 3-D structure in order to use the 3-D structure as an optical structure; and depositing a metal thin film at a vertex of the 3-D structure.

2. The operating method of claim 1, wherein:

forming the quantum dot over the n type-doped thin film comprises forming the quantum dot over the n type-doped thin film comprises forming the quantum dot in a heterostructure of III-nitride material which exhibits quantum confinement, and a quantum light emission of a communication wavelength band is possible at room temperature or more using intersubband transition in a conduction band as an emission transition process of the quantum emitter.

3. The operating method of claim 1, wherein forming the 3-D structure in the substrate comprises:

forming an n type-doped layer over the substrate;

forming a mask over the n type-doped layer; and forming the 3-D structure using selective area growth by removing only a mark portion of a patterned area in the mask.

4. The operating method of claim 1, wherein:

forming the n type-doped thin film at the upper part of the 3-D structure comprises generating an excess carrier by activating a dopant after the n type doping, a method of generating the excess carrier comprises a thermal activation method, and the n type-doped thin film formed at the upper part of the 3-D structure functions as a reservoir for providing a carrier when the carrier is captured in the quantum dot through voltage application.

5. The operating method of claim 2, wherein in forming the quantum dot over the n type-doped thin film, in the heterostructure, the AlN or AlGaN functions as a quantum barrier, the GaN is an active area and subject to a 3-D quantum confinement effect depending on a geometric shape of the 3-D structure, and a material of the quantum barrier forms two or more intersubbands.

6. The operating method of claim 5, wherein:

a thickness of the quantum barrier is several nm to several tens of nm, and a best condition of the thickness of the quantum barrier comprises a thickness at which a carrier is not captured in the quantum dot by quantum tunneling before a carrier is captured in the quantum dot through voltage application, but comprises a thickness at which quantum tunneling is possible at a specific voltage when a carrier is captured in the quantum dot through voltage application.

7. The operating method of claim 1, wherein forming the quantum dot over the n type-doped thin film comprises growing the quantum dot using a difference in growth speed according to a crystal direction of the 3-D structure when growing a nitride semiconductor.

8. The operating method of claim 1, wherein regrowing the 3-D structure in order to use the 3-D structure as the optical structure comprises:

controlling a far field pattern of light emitted from the quantum dot, and increasing extraction efficiency to an outside of the 3-D structure.

9. The operating method of claim 2, wherein capturing the carrier in the quantum dot formed at the upper part of the structure by applying the voltage to the connected electrodes comprises capturing an excess carrier outside a semiconductor quantum dot in the quantum dot using quantum tunneling in a ground level of the intersubband by applying a voltage because a carrier needs to be present in the ground level of the intersubband in order to use intersubband transition of the quantum dot.

10. The operating method of claim 2, wherein capturing the carrier in the quantum dot formed at the upper part of the structure by applying the voltage to the connected electrodes comprises capturing a single carrier or two carriers in the ground level of the intersubband within a conduction band of the quantum dot in response to the applied voltage.

* * * * *